UNITED STATES PATENT OFFICE.

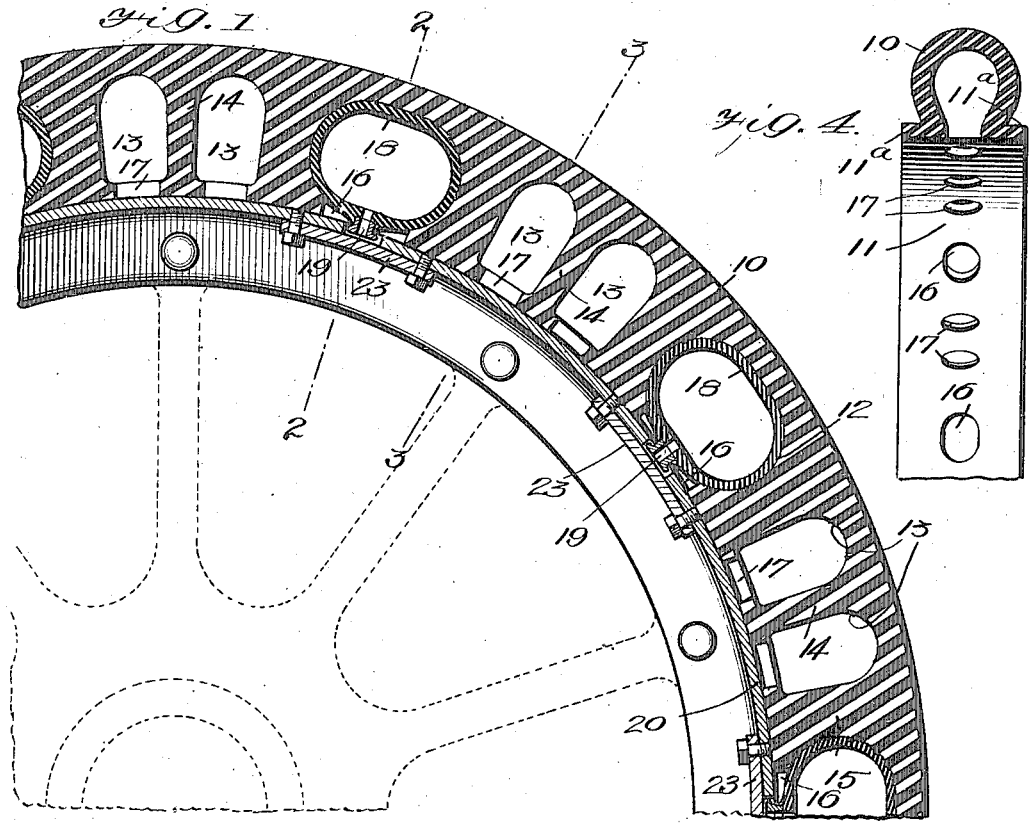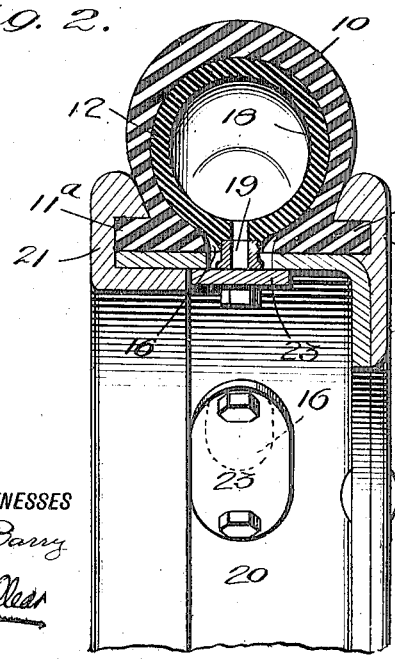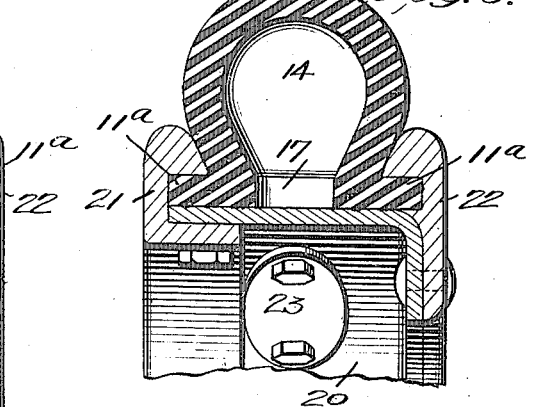

ANTONIO TERESA, OF HABANA, CUBA, ASSIGNOR OF ONE-THIRD TO MANUEL PRIETO AND ONE-THIRD TO MIGUEL GOIZUETA, BOTH OF HABANA, CUBA.

TIRE.

1,233,143.      Specification of Letters Patent.      Patented July 10, 1917.

Application filed September 27, 1916. Serial No. 122,505.

*To all whom it may concern:*

Be it known that I, ANTONIO TERESA, a subject of the King of Spain, and a resident of Habana, in the Republic of Cuba, have invented a new and useful Improvement in Tires, of which the following is a specification.

My present invention relates generally to tires for automobile and other vehicle wheels, my object being to provide a durable, effective construction partaking both of the nature of pneumatic and cushion tires, combining the durability of the cushion tire with the greater resiliency and easier riding qualities of the pneumatic tire.

With these objects generally in mind, my invention contemplates the provision of a tire having an inner flat base portion provided with laterally extending flanges whereby to provide for its effective connection upon a wheel rim, the body of the tire being generally of the shape of the usual tire and having an annular series of cells, separate from one another and communicating by means of individual openings through the flat inner periphery of the tire, small inflatable tubes being disposed in certain of the cells, and the body and its flat inner periphery being otherwise solid, with portions thereof extending between the several cells of the series.

More particularly my invention resides in the tire construction to be now described with reference to the accompanying drawing, illustrating the same, and forming a part of this specification, and wherein, Figure 1 is a section through a portion of my improved tire, taken on substantially median line and illustrating the same in operative position upon a wheel rim, Fig. 2 is a radial section taken substantially on line 2—2 of Fig. 1, Fig. 3 is a similar view taken substantially on line 3—3 of Fig. 1, Fig. 4 is a radial section through my improved tire removed from the rim.

Referring now to these figures, my improved tire includes a body 10, the outer shape or configuration of which is similar to that of the ordinary tire, being rounded transversely over its tread portion and sides, to the laterally projecting inner flanges 11ª extending outwardly beyond the sides of the body 10 from its inner tread portion 11. The body 10, as best seen by reference to Fig. 1, is provided with an annular series of cells 12 and 13, the former of which are of somewhat greater dimensions than the latter and the cells 13 of which are arranged in pairs, one pair being disposed between adjacent cells 12, so as to space the latter apart throughout the series, and thus provide portions 14 of the otherwise solid body 10 between the cells 13, and portions 15 of the said body between the cells 12 and 13, it being noted that the intervening portions 15 between the cells 12 and 13 are of somewhat greater thickness than the portions 14 of the body 10 between the cells 13 of each pair.

The flat inner periphery 11, as best seen in Fig. 4, is provided with an annular series of openings 16 and 17, the openings 16 of which communicate with the cells 12 and the openings 17 of which communicate with the cells 13. The cells 13 of the tire body contain air at atmospheric pressure at all times in use, while the cells 12 are provided with inflatable tubes 18, the valves at 19 of which project through and but slightly beyond the communicating openings 16 through the flat inner periphery 11.

The tire so constructed is adapted for utilization in connection with a wheel rim 20 as seen in Figs. 1, 2 and 3, which is flat as shown and provided with annular side rings 21 and 22, one at least of which is detachable, engaging over the lateral flanges 11 before mentioned, said rim having openings adapted to register with the openings 16 of the inner periphery 11 of the tire, and thus receive the slightly projecting portions of the valves 19 of the inflatable tubes 18. The rim is also preferably provided with inner detachably supported plates or caps 23 normally covering its openings, before mentioned, to thus protect the valves 19 and thus eliminate from the entire structure all extensions of any portion of the tire beyond the inner limits of the rim 20.

It is obvious from the foregoing that partaking as it does, of the nature of a cushion tire, my improved tire will be durable and that partaking also of the nature of a pneumatic tire, it will at the same time have greater resiliency and better riding qualities than is possible with the cushion tires at present known.

It is also to be observed that due to the particular construction employed with respect to the several cells 12 of the tire and their individual inflatable tubes, the cost of upkeep of the tire and puncturing thereof will be considerably reduced. The usual trouble in removing an inner tube in case of puncture is also eliminated by my improved construction of tire, it being simply necessary to remove one of the rim plates 23 and then the corresponding inflatable tube 18, deflated, of course, at that time, and to substitute another inflatable tube, the cost of which is for obvious reasons, materially below that of the usual inflatable tube extending entirely around and within the tire.

I claim:—

1. A tire having an annular series of spaced cells and a substantially flat inner periphery provided with a series of openings communicating with said cells, said tire having an otherwise solid body, portions of which body extend between said cells and between said openings to separate the same, and inflatable tubes within certain of the said cells, certain other cells being between the cells containing said tubes.

2. A tire having an annular series of spaced cells and a substantially flat inner periphery provided with a series of openings communicating with said cells, said tire having an otherwise solid body, portions of which body extend between said cells and between said openings to separate the same, and inflatable tubes within certain of the said cells, the other cells being arranged in pairs between the cells occupied by the said tubes.

3. A tire having an annular series of spaced cells, inflatable tubes within said cells, said tire having a series of cells between said first-named cells, and an inner flat peripheral portion provided with openings communicating with the several cells, said body and its inner peripheral portion being otherwise solid.

4. A tire having an annular series of spaced cells, inflatable tubes within certain of said cells, the other cells of the series being arranged in pairs between the said cells containing the inflatable tubes, and said tire having an inner periphery provided with openings communicating with the several cells and having an otherwise solid body.

5. A tire having an annular series of spaced cells and an otherwise solid body, and means within certain of said cells to contain air under pressure, the other cells of the series containing air at atmospheric pressure.

ANTONIO TERESA.

Copies of this patent may be obtained for five cents each, by addressing the "Commissioner of Patents, Washington, D. C."